(12) United States Patent
Porte

(10) Patent No.: US 8,366,039 B2
(45) Date of Patent: Feb. 5, 2013

(54) FAIRING FOR A PYLON VIA WHICH A TURBINE ENGINE IS SUSPENDED FROM A WING OF AN AIRCRAFT

(75) Inventor: Alain Porte, Colomiers (FR)

(73) Assignee: Airbus Operations SAS, Toulouse (FR)

( * ) Notice: Subject to any disclaimer, the term of this patent is extended or adjusted under 35 U.S.C. 154(b) by 951 days.

(21) Appl. No.: 12/305,903

(22) PCT Filed: Jun. 18, 2007

(86) PCT No.: PCT/FR2007/001009
§ 371 (c)(1),
(2), (4) Date: Dec. 19, 2008

(87) PCT Pub. No.: WO2007/147965
PCT Pub. Date: Dec. 27, 2007

(65) Prior Publication Data
US 2010/0176250 A1 Jul. 15, 2010

(30) Foreign Application Priority Data
Jun. 20, 2006 (FR) ...................................... 06 05448

(51) Int. Cl.
*B64D 27/00* (2006.01)
(52) U.S. Cl. ........................................ 244/54; 244/53 B
(58) Field of Classification Search .................... 244/54, 244/53 R, 53 B, 130; *B64D 33/02, 27/00, B64D 27/26*
See application file for complete search history.

(56) References Cited

U.S. PATENT DOCUMENTS

| 3,750,983 A | | 8/1973 | Morris | |
|---|---|---|---|---|
| 4,603,821 A | * | 8/1986 | White | 244/54 |
| 5,157,915 A | | 10/1992 | Bart | |
| 5,524,847 A | * | 6/1996 | Brodell et al. | 244/54 |

(Continued)

FOREIGN PATENT DOCUMENTS

| EP | 0 453 360 | 10/1991 |
|---|---|---|
| EP | 0 733 545 | 9/1996 |

(Continued)

OTHER PUBLICATIONS

International Search Report dated Dec. 17, 2007 w/ English translation.

(Continued)

*Primary Examiner* — Christopher P Ellis
(74) *Attorney, Agent, or Firm* — Dickinson Wright PLLC

(57) ABSTRACT

Disclosed is a pylon fairing for a turbine engine. The anterior portion of the pylon fair is attached to a turbine engine in a manner to absorb blows against the fan casing of the turbine engine in case of breakage of the fan blades of the turbine engine. The pylon fairing is configured with the turbine engine such that the anterior part of the pylon fairing is fastened to the engine's fan casing via a front fixing and a rear fixing. The rear fixing is affixed to the fan casing as relatively loose in order to absorb tolerances, and the front fixing is affixed to the fan casing and as flexible in at least approximately a radial direction with respect to the fan casing.

8 Claims, 5 Drawing Sheets

U.S. PATENT DOCUMENTS

| | | | |
|---|---|---|---|
| 5,642,615 A * | 7/1997 | Porte et al. | 60/226.1 |
| 5,706,648 A * | 1/1998 | Porte et al. | 60/226.1 |
| 5,860,275 A * | 1/1999 | Newton et al. | 60/226.1 |
| 6,935,591 B2 * | 8/2005 | Udall | 244/54 |
| 6,959,553 B2 | 11/2005 | Anderson | 60/797 |
| 7,090,165 B2 * | 8/2006 | Jones et al. | 244/53 R |
| 8,033,094 B2 * | 10/2011 | Suciu et al. | 60/226.1 |
| 2004/0227033 A1 * | 11/2004 | Picard et al. | 244/54 |
| 2004/0245383 A1 * | 12/2004 | Udall | 244/54 |
| 2006/0060697 A1 | 3/2006 | Beaufort | |
| 2008/0073460 A1 * | 3/2008 | Beardsley et al. | 244/54 |

FOREIGN PATENT DOCUMENTS

| | | |
|---|---|---|
| FR | 2 102 187 | 4/1972 |
| FR | 2 861 364 | 4/2005 |

OTHER PUBLICATIONS

Written Opinion of the International Searching Authority with English translation.

* cited by examiner

FAIRING FOR A PYLON VIA WHICH A TURBINE ENGINE IS SUSPENDED FROM A WING OF AN AIRCRAFT

FIELD OF THE INVENTION

The present invention relates to a fairing for a pylon via which a turbine engine is suspended from an aircraft wing.

BACKGROUND OF THE INVENTION

It is known that, for aerodynamic purposes, a turbine engine suspension pylon is covered with a fairing. It is additionally known that, in general, a fairing such as this comprises an anterior part which:
- is positioned facing the upper part of the turbine engine fan casing,
- has the at least approximate shape of an inverted channel section cut into a whistle shape,
- is laterally connected to the external fan cowl in such a way that its front end lies flush with the turbine engine air intake external cowl,
- can be used to attach the fan cowls, and
- is fastened to said fan casing via a front fixing and via a rear fixing.

In known suspension pylon fairings of this type, said front and rear fixings are rigid in order to hold said fairing anterior part firmly in place on the engine. However, in order to be able to absorb manufacturing and assembly tolerances, it is customary to produce said rear fixing in the form of a relatively loose or adjustable connection.

It will be noted that this fairing anterior part lies in vertical alignment with the fan blades. Hence, when a blade breaks off this impeller and strikes a hard blow on the fan casing under said fairing anterior part, the resulting struck blow is transmitted to the latter part mainly by said rigid front fixing. This causes said fairing anterior part to lift, rotating about the articulation formed by said loose rear fixing, and to deform irreversibly, the front end of this fairing anterior part lifting with respect to the turbine engine air intake external cowl. This causes the fairing anterior part therefore to form a kind of scoop that is particularly prejudicial to aircraft performance, particularly in terms of drag. In a scoop such as this could cause the fan cowls to be ripped off.

SUMMARY OF THE INVENTION

It is an object of the present invention to overcome this disadvantage.

To this end, according to the invention, the fairing for a pylon via which a turbine engine is suspended from an aircraft wing, said turbine engine comprising:
- a tubular air intake surrounded by an air intake external cowl; and
- a fan, supplied with air by said air intake and enclosed in a fan casing, itself surrounded by an external fan cowl in aerodynamic continuity with said air intake external cowl, and said suspension pylon fairing having an anterior part which:
- is positioned facing the upper part of said fan casing,
- has the at least approximate shape of an inverted channel section cut into a whistle shape,
- is laterally connected to said external fan cowl in such a way that its front end lies flush with said air intake external cowl, and
- is fastened to said fan casing via a front fixing and via a rear fixing, said rear fixing being relatively loose in order to absorb tolerances, is notable in that said front fixing is flexible in the at least approximately radial direction with respect to said fan casing.

By virtue of such flexibility, deformations of said fairing anterior part resulting from their being struck by a fan blade or a piece of fan blade, are at least partially absorbed by said front fixing so that no scoop is formed or so that, at the very most, the front end of the anterior fairing part is only by a small amount no longer flush with the turbine engine air intake external cowl.

Said flexible front fixing may be embodied in many ways including a spring link, a link made of an elastically or plastically deformable material, etc.

However, in a preferred embodiment, said front fixing comprises a sheet of sheet metal or similar material, that is transverse with respect to said fan casing and with respect to said fairing anterior part, and said sheet has at least one bend between said fan casing and said fairing anterior part.

Thus, when a fan blade or a piece of fan blade strikes the fan casing radially from the inside outward, said bend provides the front fixing with flexibility and absorbs the energy of this blow, thus at the very least in part avoiding a scoop being formed.

In the known way, the turbine engine tubular air intake may comprise an internal wall defining, with said air intake external cowl, a chamber that is closed off, at said fan end, by an annular rear partition connecting said internal wall and said air intake external cowl.

In this case, it is advantageous for said rear partition also to have radial flexibility. In that way, the rear edge of said air intake internal wall is also capable at least partially of absorbing the energy of a blow struck by a fan blade or a piece of fan blade.

With preference, the radial flexibility of said front fixing and the radial flexibility of said rear partition are at least approximately equal. Thus the rear edge of the tubular air intake internal wall and the fairing anterior part can deform evenly.

BRIEF DESCRIPTION OF THE DRAWINGS

The figures of the attached drawing will make it easy to understand how the invention may be embodied. In these figures, references that are identical denote elements that are similar.

DETAILED DESCRIPTION OF THE INVENTION

Figure 1:
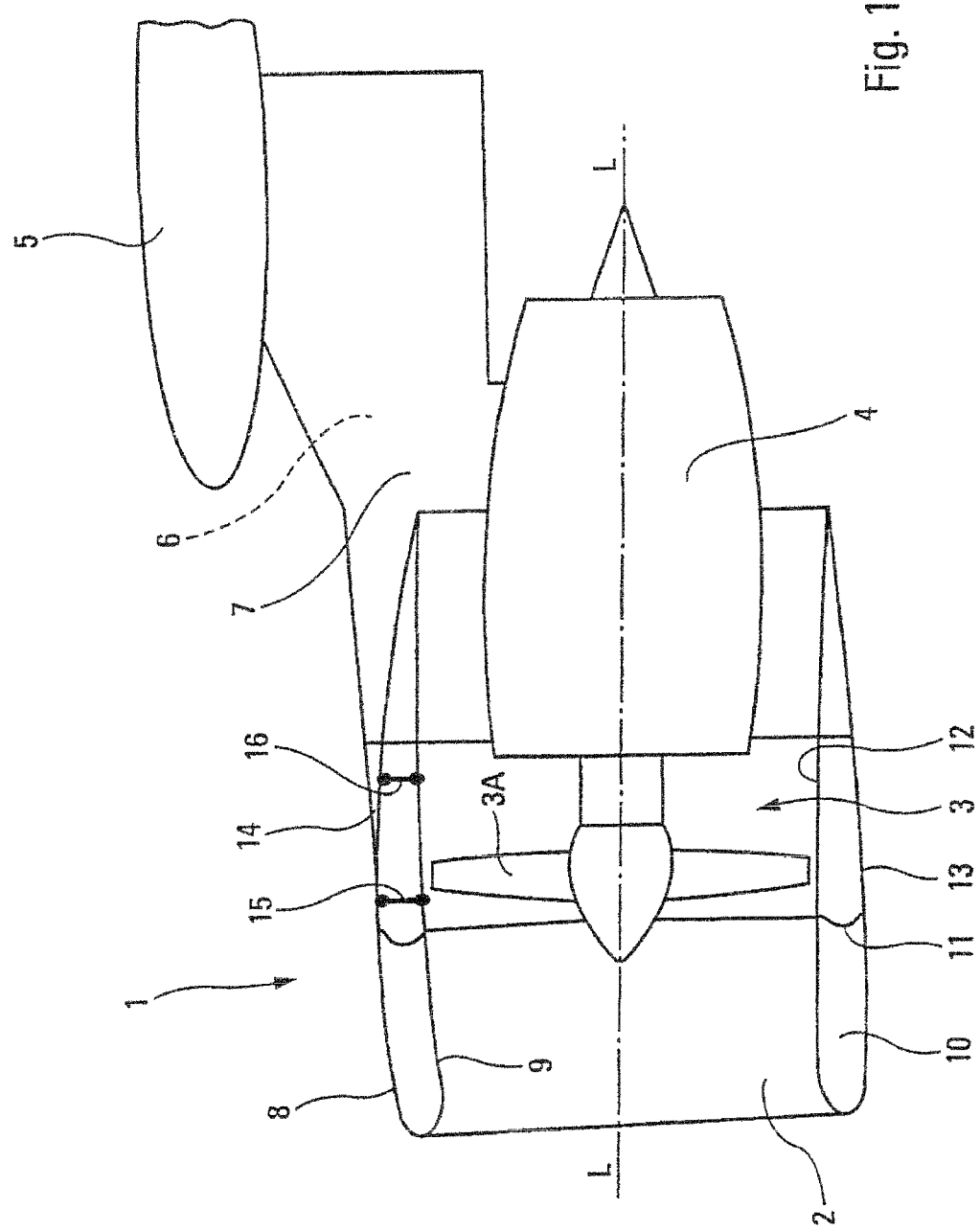
FIG. 1 is a schematic and partial view in longitudinal section of a turbine engine suspended from an aircraft wing via a pylon that has a fairing.

The turbine engine 1 depicted schematically in FIG. 1 has a longitudinal axis L-L along which a tubular air intake 2, a fan 3 and a hot air generator 4 are distributed, from front to rear.

The turbine engine 1 is suspended from an aircraft wing 5 via a suspension pylon 6 covered with an aerodynamic fairing 7.

The tubular air intake 2 consists of an air intake external cowl 8 and of an internal wall 9, said external cowl 8 and said internal part 9 between them delimiting a chamber 10 that is closed off facing the fan 3 by an annular rear partition 11 connecting said external cowl 8 and said internal wall 9.

The fan 3, which is fitted with blades 3A, is supplied with air by said air intake 2 and is enclosed in a tubular fan casing 12, in aerodynamic continuity with said internal wall 9 of said air intake 2. The fan casing 12 is surrounded by an external fan cowl 13, in aerodynamic continuity with said air intake external cowl 8.

The fairing 7 of the suspension pylon 6 comprises an anterior part 14 positioned facing the upper part of the fan casing 12, that is to say above the latter, and fastened to said fan casing 12 by a front fixing 15 and by a rear fixing 16.

Figure 2:
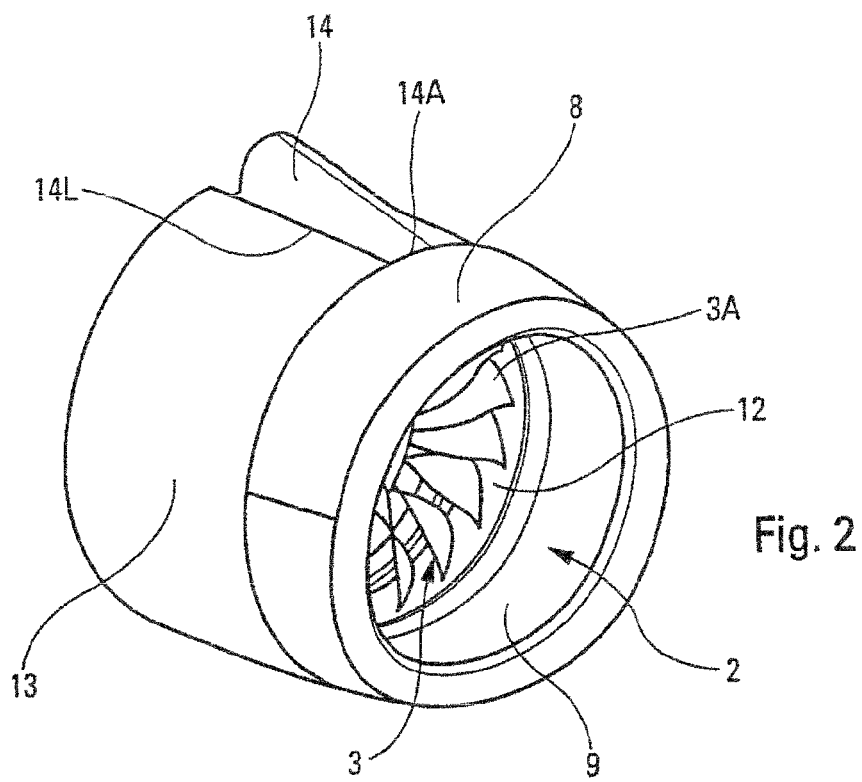
FIG. 2 is a perspective view from the front of a turbine engine provided with the fairing anterior part of said suspension pylon.
Figure 3:
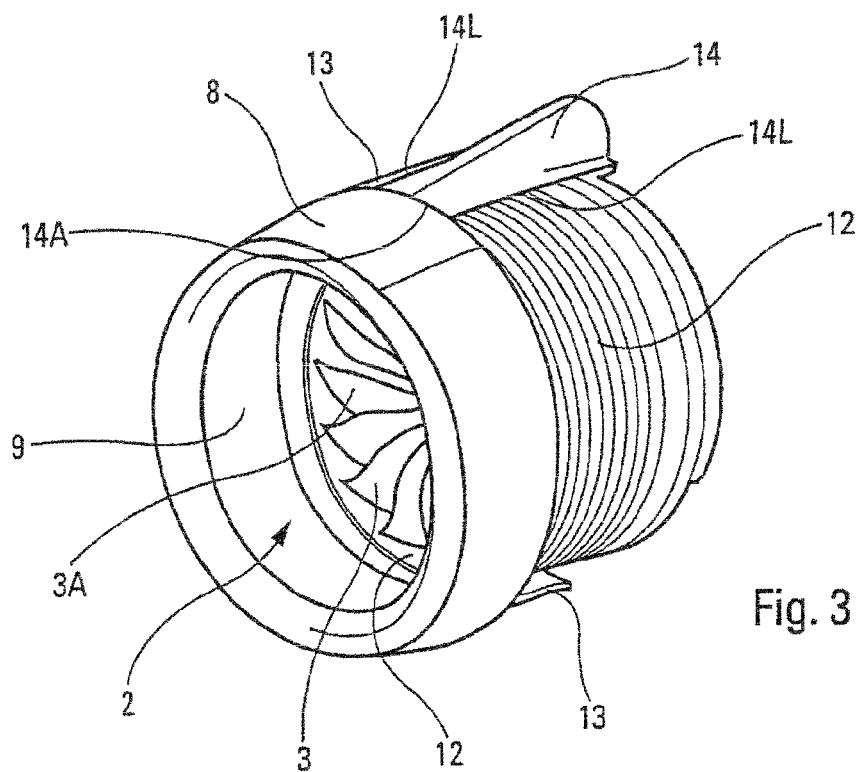
FIG. 3 is a perspective view from the front of the turbine engine of FIG. 2, with the external fan cowl partially removed.
Figure 4:
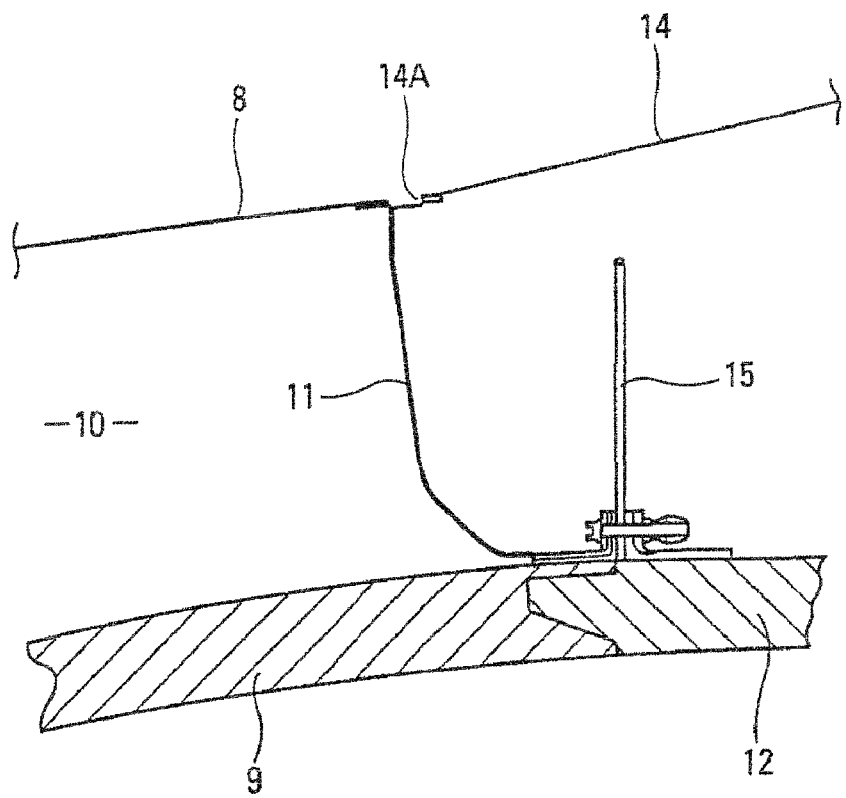
FIGS. 4 and 5 schematically illustrate the deformations caused by a fan blade striking the fan casing when said front fixing is rigid.

FIGS. 2 and 3, which depict the front part of the turbine engine 1 in perspective, show the tubular air intake 2, the fan 3 and its blades 3A, the air intake external cowl 8, the air intake internal wall 9, the tubular fan casing 12 (see FIG. 3 in particular), the external fan cowl 13 (partially removed in FIG. 3) and the fairing anterior part 14.

FIGS. 2 and 3 additionally show that said fairing anterior part 14 has at least approximately the shape of an inverted channel section cut into a whistle shape, the lateral edges 141 of which connect to said external fan cowl 13 and the front edge 14A of which lies flush with the air intake external cowl 8.

In order to be able to absorb manufacturing and assembly tolerances, the rear fixing 16, which may be of any known configuration, is relatively loose and allows a limited rotation of the fairing anterior part 14 about it. By contrast, the front fixing 15 is rigid in order to secure said part 14 in position.

Figure 5:
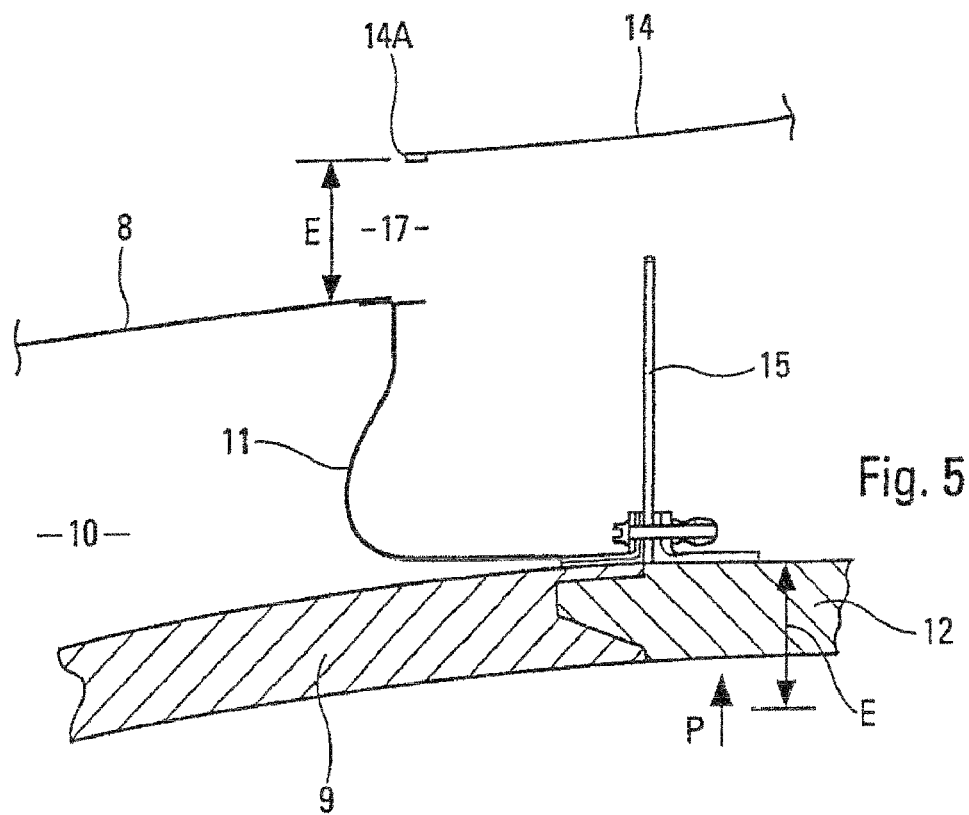

The result of this arrangement is that when a blade 3A of the fan 3 breaks off and strikes the fan casing 12 in vertical alignment with the fairing front part 14 (see FIG. 5 in which the blow struck by a blade 3A is shown by the arrow 2), the casing 12 is deformed by a significant amount E and the struck blow is transmitted in full to said fairing anterior part 14 by said rigid front fixing 15. Under the action of this struck blow, said fairing part 14 therefore pivots about the rear fixing 16 and undergoes permanent deformation so that a wide slot 17, of a width that is great corresponding to the height E, opens up between the front edge 14A of the fairing part 14 and the air intake external cowl 8. The fairing part 14 therefore behaves, in flight, like a scoop (see FIG. 5).

Figure 6:
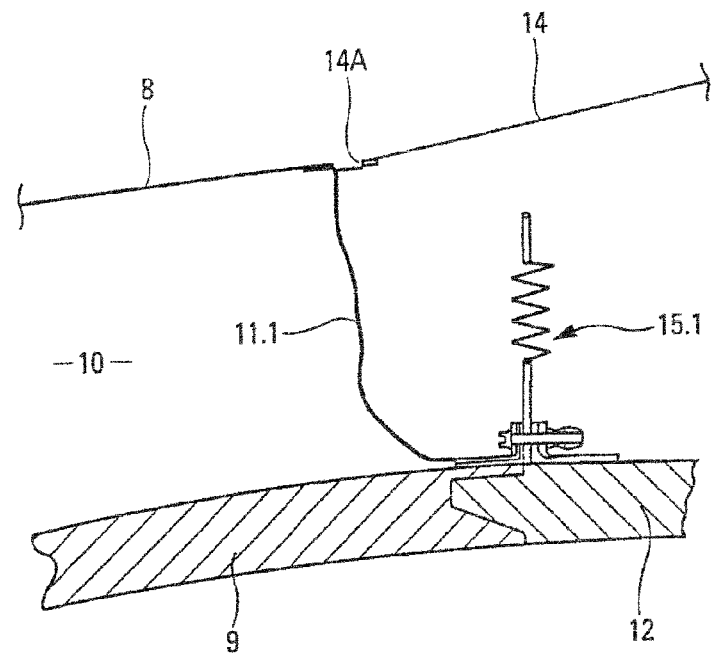
FIGS. 6 and 7 schematically illustrate the deformations caused by a fan blade striking the fan casing when said front fixing is radially flexible.
Figure 7:
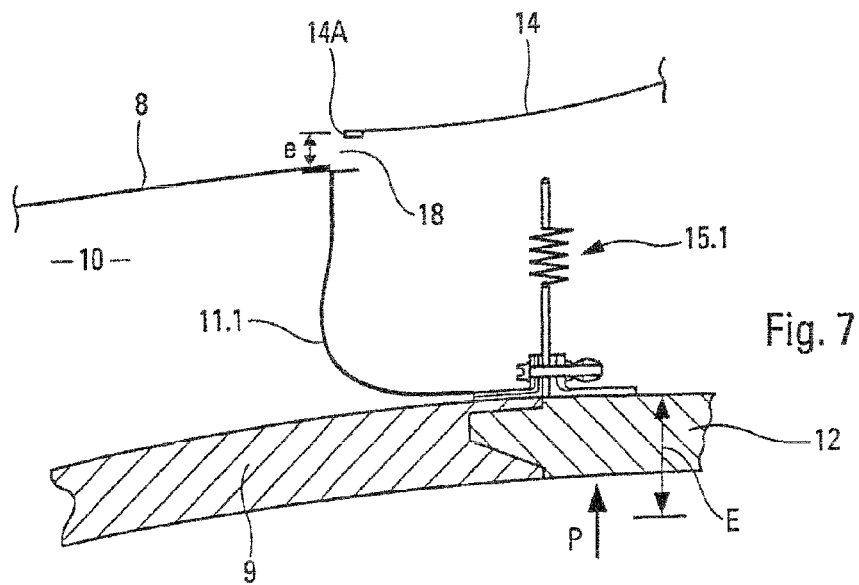

To overcome this disadvantage, in the embodiment of the present invention that is illustrated schematically in FIGS. 6 and 7, use is made of a front fixing 15.1 and an annular partition 11.1 (as respective replacements for the front fixing 15 and the annular partition 11 described above) that have at least approximately similar flexibilities transversely to the longitudinal axis L-L of the turbine engine 1. To achieve this, said annular partition 11.1 may be made of a plastically deformable material such as aluminum while the front fixing 15.1 may be of the spring link or similar type. The radial flexibility of the annular partition 11.1, instead of being the result of the material of which it is made, may be obtained through some other measure, such as by shaping it with concentric bend(s), by producing it in several rigid parts joined together by flexible or frangible means, etc.

Thus, when a broken blade 3A strikes the fan casing 12 (arrow P in FIG. 6), the flexibilities of the annular partition 11.1 and of the front fixing 15.1 absorb, if not all, then at least most, of the energy of the blow so that, at most, the slot that opens up between the front edge 14A of the fairing part 14 and the air intake external cowl 8 (see FIG. 7) is only a small slot 18, of small width e, that has only a very small impact on aircraft performance, even though the casing 12 has deformed by the substantial amount E.

Figure 8:
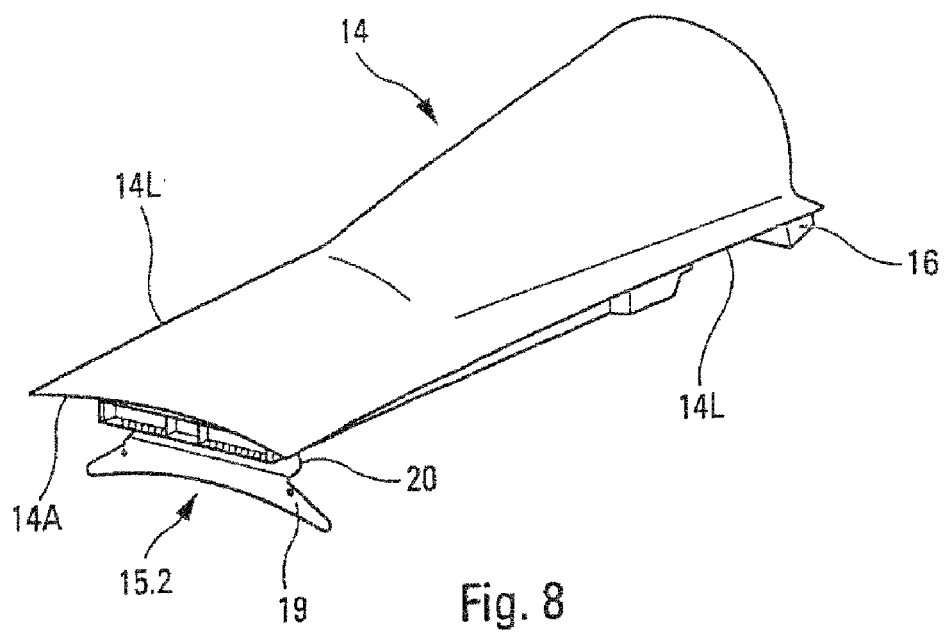
FIG. 8 is a perspective view from the front of said suspension pylon fairing anterior part, provided with a preferred embodiment of said front fixing.
Figure 9:
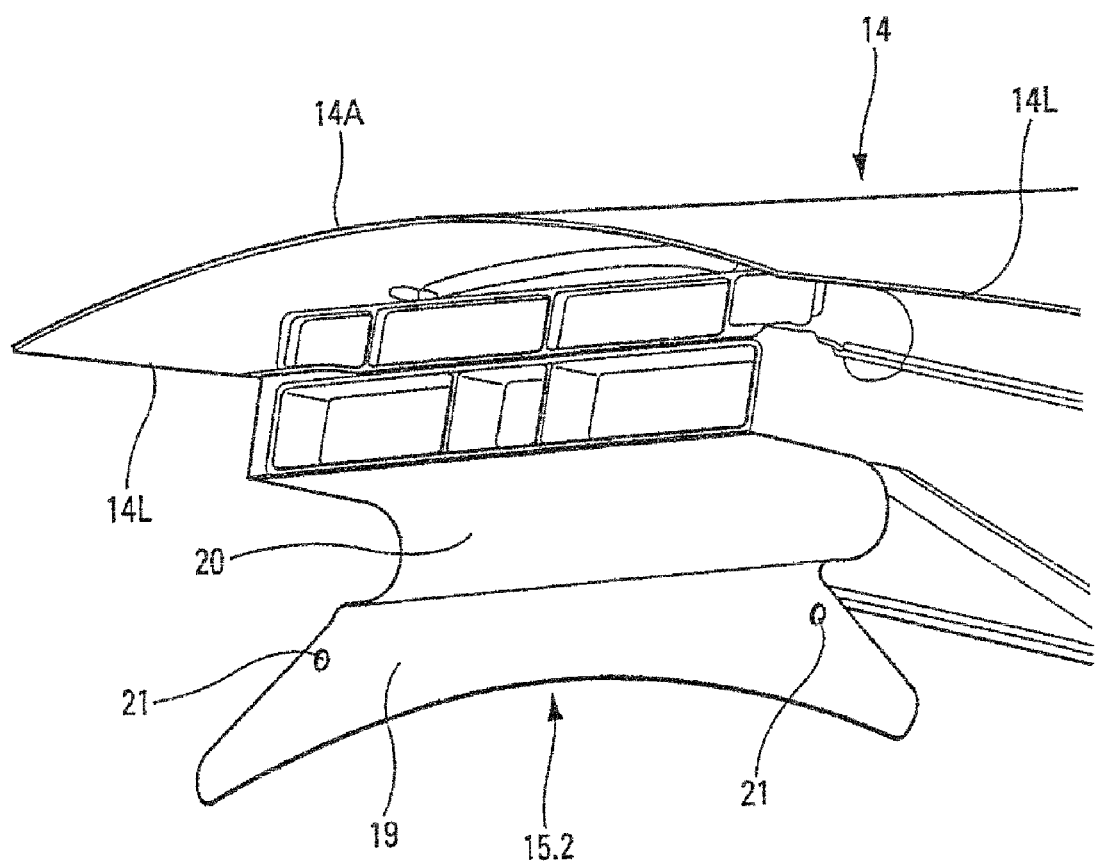
FIG. 9 is a partial perspective view from the front, and on a larger scale, of said anterior part, showing said front fixing.

FIGS. 8 and 9 illustrate a preferred embodiment 15.2 that differs from the embodiment 15.1 for said front fixing 15. This embodiment 15.2 consists of a sheet of sheet metal or the like 19, secured to the fairing part 14 and positioned transversely to the longitudinal axis L-L. The sheet 19 has at least one transverse bend 20 positioned between the fan casing 12 and the part 14 when the latter is fastened to said casing 12. To do this, said sheet 19 has fastening means 21.

The invention claimed is:

1. A fairing for a pylon, including a turbine engine, wherein:
said turbine engine comprises:
a tubular air intake surrounded by an air intake external cowl; and
a fan, supplied with air by said air intake and enclosed in a fan casing, wherein the fan casing is surrounded by an external fan cowl in aerodynamic continuity with said air intake external cowl,
wherein said pylon fairing has an anterior part, and the pylon fairing is configured with the turbine engine such that the anterior part of the pylon fairing:
is positioned facing an upper part of said fan casing,
has the at least approximate shape of an inverted channel section cut into a whistle shape,
is laterally connected to said external fan cowl through a front end that lies flush with said air intake external cowl, and
is fastened to said fan casing via a front fixing and via a rear fixing, said rear fixing is affixed to said fan casing as relatively loose in order to absorb tolerances, and said front fixing affixed to said fan casing and as flexible in at least approximately a radial direction with respect to said fan casing.

2. The fairing according to claim 1, wherein said front fixing (15.1) is of the spring link or similar type.

3. The fairing according to claim 1, wherein said front fixing (15.1) is a link made of a plastically or elastically deformable material.

4. The fairing according to claim 1, wherein said front fixing comprises a sheet of sheet metal that is transverse with respect to said fan casing and with respect to said fairing anterior part, and said sheet has at least one bend between said fan casing and said fairing anterior part.

5. The fairing according to claim 1, wherein the tubular air intake which comprises an internal wall defining, with said air intake external cowl, a chamber that is closed off, at said fan end, by an annular rear partition connecting said internal wall and said air intake external cowl, wherein said rear partition has radial flexibility.

6. The fairing according to claim 5, wherein the radial flexibility of said front fixing and the radial flexibility of said rear partition are approximately equal.

7. The fairing according to claim 5, wherein said rear partition is made of a plastically deformable material.

8. The fairing according to claim 4, wherein said front fixing is secured to said fairing anterior part and comprises means to fasten the fairing anterior part to said fan casing.

* * * * *